United States Patent [19]

Taki et al.

[11] Patent Number: 4,744,902
[45] Date of Patent: May 17, 1988

[54] ANNULAR WAVE FILTER DEVICE

[75] Inventors: Yoshihiro Taki, Nagoya; Toshiaki Fukuta; Hajime Akado, both of Anjo; Susumu Miyakawa, Kariya; Yoshitaka Nishio, Nagoya, all of Japan

[73] Assignee: Nippondenso Co., Ltd., Kariya, Japan

[21] Appl. No.: 824,949

[22] Filed: Jan. 31, 1986

Related U.S. Application Data

[60] Division of Ser. No. 743,878, Jun. 12, 1985, Pat. No. 4,569,813, which is a continuation of Ser. No. 519,666, Aug. 23, 1983, abandoned.

[30] Foreign Application Priority Data

Aug. 4, 1982 [JP] Japan ................. 57-136591
Jul. 2, 1983 [JP] Japan ................. 58-120762

[51] Int. Cl.⁴ .............................................. B01D 27/06
[52] U.S. Cl. ................. 210/493.1; 210/493.5; 55/521; 55/524
[58] Field of Search ............... 210/493.1, 493.2, 493.5, 210/506; 55/500, 521, 524

[56] References Cited

U.S. PATENT DOCUMENTS

| | | | |
|---|---|---|---|
| 3,164,506 | 1/1965 | Lake | 210/493.2 |
| 4,014,796 | 3/1977 | Sugiyama et al. | 55/500 |
| 4,154,688 | 5/1979 | Pall | 210/493.1 |
| 4,422,861 | 12/1983 | Dusza | 55/524 |
| 4,430,223 | 2/1984 | Miyakawa et al. | 210/493.5 |
| 4,439,321 | 3/1984 | Taki et al. | 210/493.1 |
| 4,452,619 | 6/1984 | Wright et al. | 55/500 |
| 4,498,989 | 2/1985 | Miyakawa et al. | 210/493.4 |
| 4,522,719 | 6/1985 | Kuwajima et al. | 210/493.2 |

Primary Examiner—Peter Hruskoci
Assistant Examiner—Wanda L. Millard
Attorney, Agent, or Firm—Cushman, Darby & Cushman

[57] ABSTRACT

A filter device includes an annular filter element having a plurality of wave portions extending outwardly, a central cup-shaped portion arranged at an inner periphery of the filter element, a support frame arranged at an outer periphery of the filter element, and a connecting portion at which both sides of the filter element are abutting on and connected with each other. The central portion, the support frame and the connecting portion are made of synthetic resin and formed as a unitary structure, wherein the outermost and innermost peripheral ends of the filter element are respectively embedded in and held by the support frame and the central portion.

16 Claims, 8 Drawing Sheets

ANNULAR WAVE FILTER DEVICE

This is a division of application Ser. No. 743,878, filed June 12, 1985, now U.S. Pat. No. 4,569,813, which was a continuation of Ser. No. 519,666, filed Aug. 23, 1983, now abandoned.

FIELD OF THE INVENTION

The present invention relates to a filter device, for example, used in an air cleaner for an automotive vehicle and to a manufacturing method of the filter device.

We have already proposed a filter device, a filter element of which has a two-dimensional wave form and is manufactured by folding a filter sheet along a plurality of folding lines parallel with each other, bending the folded sheet into an annular form and connecting both of abutting sides of the filter element with each other.

For the purpose of housing and fixing the filter element in a casing of an air cleaner, it is necessary to previously support the filter element on a support member so that both inner and outer peripheral ends of the filter element are firmly fixed to and supported on the support member, for example, by means of adhesive material. The filter device manufactured as above and comprised of the filter element and the support member can be easily handled and installed in the air cleaner casing. As a consequence, the above described filter device requires the support member as a separate element resulting in an increase of a number of elements as well as manufacturing steps.

SUMMARY OF THE INVENTION

It is, therefore, an object of the present invention to provide a filter device, which comprises a filter element, a support frame made of synthetic resin and formed at an outer periphery of the filter element, a central cup-shaped portion also made of synthetic resin and formed at an inner periphery of the filter element, and a connecting portion made of synthetic resin for connecting both abutting sides of the filter element, wherein the support frame, the central portion and the connecting portion are molded as a unitary structure.

It is another object of the present invention to provide a manufacturing method, which comprises the steps of:

folding a trapezoidal or sectorial filter sheet along a plurality of parallel folding lines;

bending a folded filter sheet into an annular form to make an annular filter element;

setting the annular filter element in a molding die apparatus, in which an outermost peripheral end of the filter element projects into an outer annular groove of the die apparatus, while an innermost peripheral end of the filter element projects into an inner annular groove of the die apparatus;

pressing and holding one side of the filter element between a first line of comb-like projections on a lower die member and a first line of comb-like projections on an upper die member, while pressing and holding the other side of the filter element between second lines of comb-like projections respectively formed on the lower and upper die members, so that both side ends of the filter element project into a space defined by the first and second lines of comb-like projections; and filling synthetic resin in the space and the grooves.

DETAILED DESCRIPTION OF PREFERRED EMBODIMENTS

The present invention will now be hereinafter explained in detail with reference to the preferred embodiments.

Figure 1:
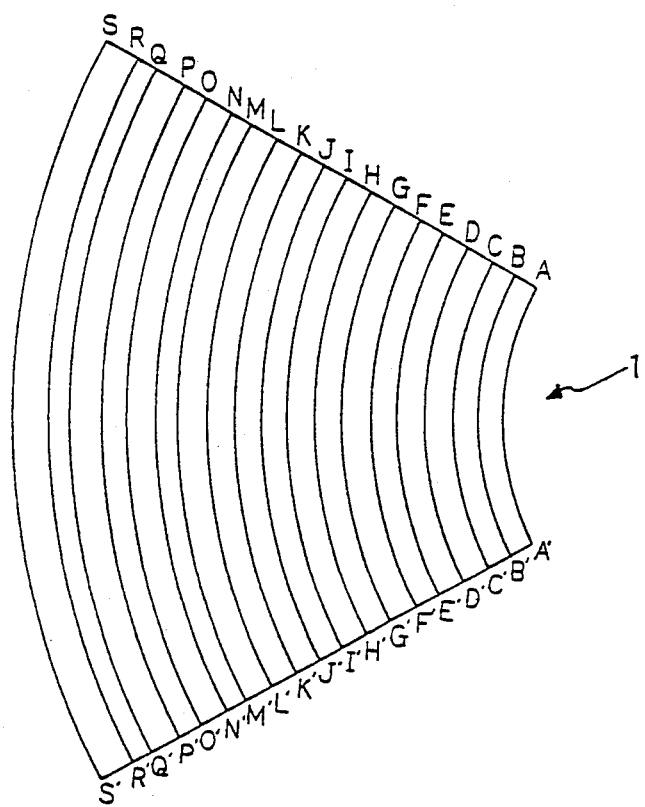
FIG. 1 is a front view of a filter sheet on which arcuate folding lines are formed.

FIG. 1 shows a filter sheet 1 of a sectorial shape, on which a plurality of parallel and arcuate folding lines B—B' to R—R' are formed. A length of one end A—A' is made smaller than that of the other end S—S' and two groups of arcuate bands having different widths between adjacent folding lines are alternately formed, i.e. a width of an arcuate band between the folding lines P—P' and Q—Q' is larger than that of an arcuate band between the folding lines Q—Q' and R—R'. A width of an outermost arcuate band between the folding line R—R' and an end line S—S' is made larger than that of the other bands.

The folding lines are formed by a heat roller to ensure a folding step along those lines. The filter sheet 1 may not be limited to the above described sectorial shape, but may be a trapezoidal shape. And in this case, the folding lines are formed as straight lines.

Figure 2:
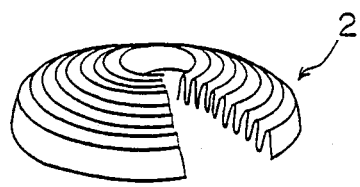
FIG. 2 is a perspective view showing a filter element folded along the folding lines.

FIG. 2 shows a filter element 2 after folding the filter sheet 1 shown in FIG. 1 and bending it into an annular form. Since the folding lines of the filter sheet are arcuate, the configuration of the filter element becomes annular as shown in FIG. 2, when it is folded therealong, and a plurality of wave portions are formed. A line connecting each crest of the wave portions as well as a line connecting each bottom thereof is slightly inclined between an outer and an inner peripheral ends of the annular form filter element as shown in FIG. 2.

This is because the two groups of the arcuate bands having different widths are alternately arranged on the filter sheet.

Figure 3:
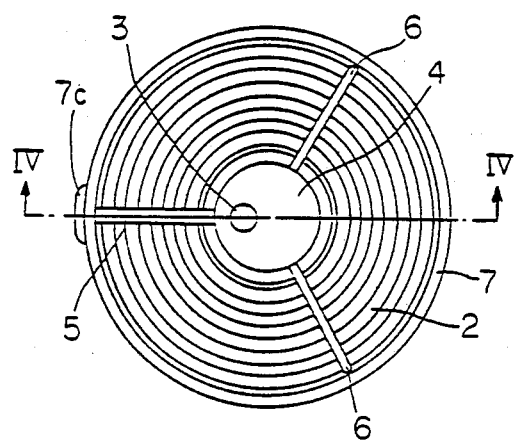
FIG. 3 is a plane view showing a filter device according to the present invention.
Figure 4:
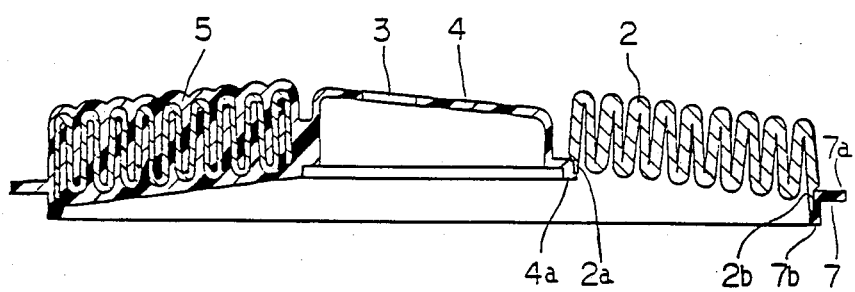
FIG. 4 is a cross-sectional view taken along a line IV—IV in FIG. 3.
Figure 5:
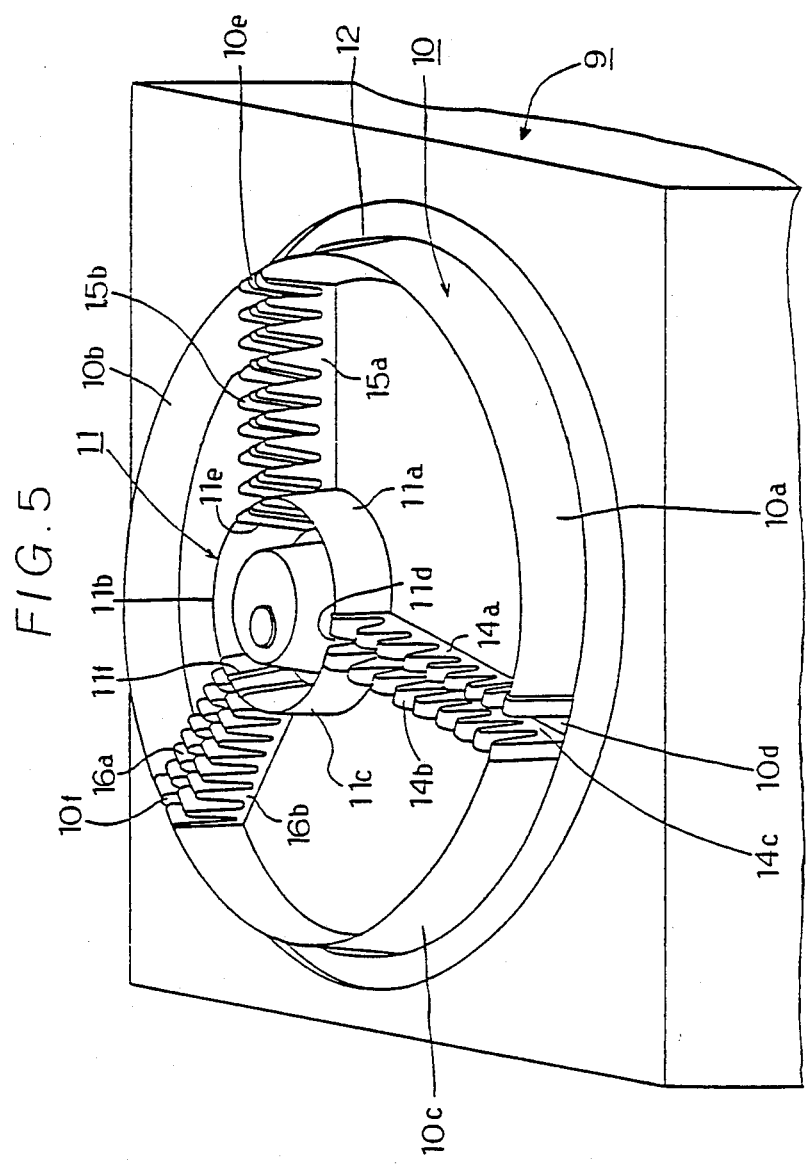
FIG. 5 is a perspective view showing a lower die member of a molding die apparatus.

In FIGS. 3 and 4 showing a complete filter device according to the present invention, numeral 4 designates a cup-shaped central portion made of synthetic resin and arranged at an inner periphery of the filter element 2, the central portion 4 including an annular leg portion 4a in which the innermost peripheral end 2a of the filter element is embedded so that it is firmly attached to and held by the central portion 4. Numeral 3 designates an opening formed in the central portion 4. Numeral 5 designates a connecting portion made of synthetic resin at which both abutting sides (A-S and A'-S') of the filter element 2 are connected with each other. Numeral 6 designates reinforcing portions made of synthetic resin and formed on the filter element 2 and numeral 7 designates a ring-shaped support frame made of synthetic resin and arranged at an outer periphery of the filter element 2, the supporting frame 7 having an annular flange portion 7a and an annular leg portion 7b, wherein the outermost peripheral end 2b of the filter element 2 is projected into and embedded in the annular leg portion 7b so that the end 2b is firmly held by the support frame 7. The central portion 4, the connecting portion 5, the reinforcing portions 6 and the support frame 7 are molded integrally with one another as a unitary structure. As the synthetic resin, for example, polypropylene, nylon, urethane, or the like can be used.

A manufacturing method for the above-constructed filter device will be explained with reference to FIGS. 5 to 10.

Figure 7:
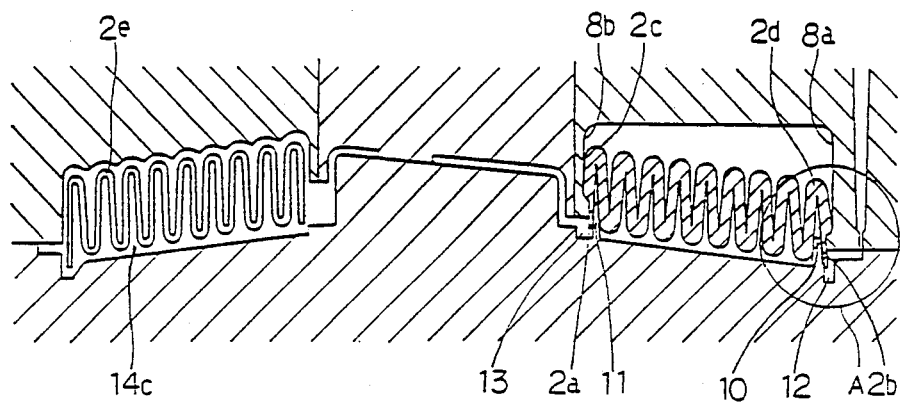
FIG. 7 is a cross-sectional view taken along a line VII—VII in FIG. 9, showing the filter element set in the molding die apparatus before the synthetic resin is filled.

At first, a molding die apparatus will be explained. Numeral 9 designates a lower die member, which comprises an outer annular projection 10 divided into three sections 10a to 10c and there are formed three spaces 10d to 10f having a small width at their discontinuous portions. Numeral 11 designates an inner annular projection likewise divided into three sections 11a to 11c and there are formed three spaces 11d to 11f having a small width at their discontinuous portions. Numeral 12 designates an outer annular groove formed at an outer side of the projection 10 (as best shown in FIG. 7), while numeral 13 designates an inner annular groove formed at inner side of the projection 11, for forming, respectively, the annular outer and inner leg portions 7b and 4a when injected and filled with synthetic resin.

Numerals 14a and 14b designate a pair of parallely-arranged comb-like projections straightly extending from the inner annular projection 11 to the outer annular projection 10 so that a straight space 14c is formed between adjacent comb-like projections 14a and 14b. Similar pairs 15a, 15b, 16a and 16b of comb-like projections are also formed on the lower die member 9.

An upper die member 8 has a similar construction as that of the above-described lower die member 9 and therefore the detailed description thereof will be omitted.

The manufacturing steps for the filter device will now be explained hereinafter. Since the filter element 2 shown in FIG. 2 is likely to be restored to its former condition as a sheet due to its elastic reactive force, the configuration of the filter element shown in FIG. 2 cannot be kept only when the filter sheet is folded along the folding lines. Accordingly, the folded filter element is set in a die (not shown) having the almost same configuration as shown in FIG. 2 and then heat and pressure are applied to the filter element in order that the annular filter element 2 as shown in FIG. 2 can be obtained which can keep its configuration even after it is removed from the die.

Figure 6:
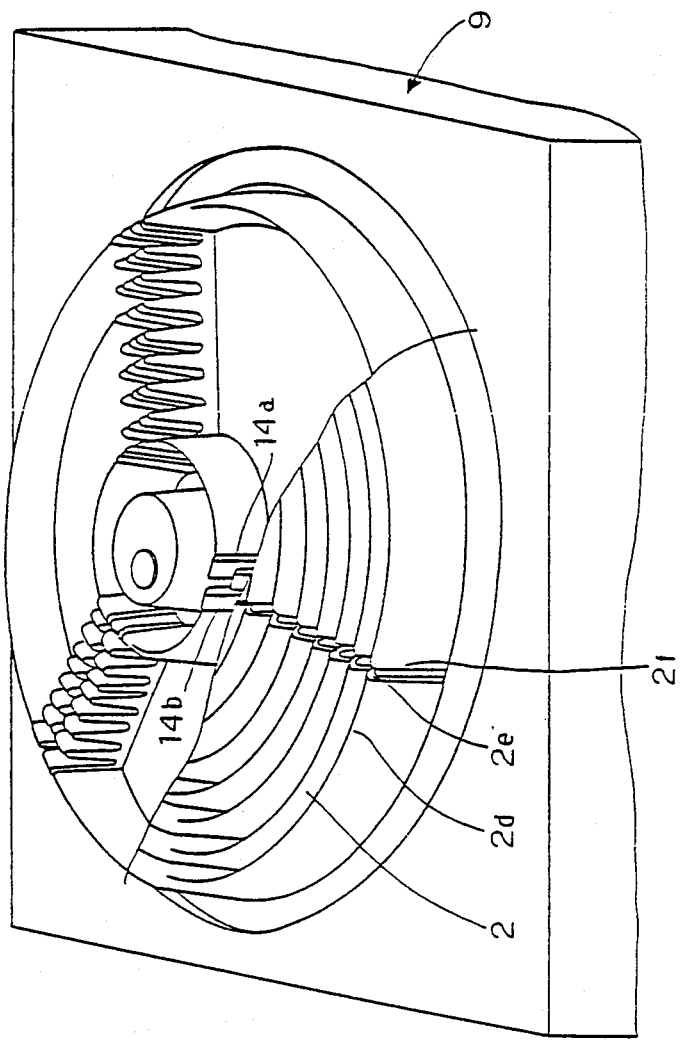
FIG. 6 is a perspective view of the lower die member on which the filter element is set.

The filter element 2 is set on the lower die member 9 as shown in FIG. 6, so that the innermost and outermost wave portions 2c and 2d rest on the inner and outer annular projections 11 and 10, respectively, that both of the abutting sides 2e and 2f of the filter element 2 project into the space 14c between the pair of comb-like projections 14a and 14b, and that the innermost and outermost peripheral ends 2a and 2b of the filter element 2 project into the inner and outer annular grooves 13 and 12, respectively as best shown in FIG. 7. Thereafter, the upper die member 8 comes down onto the lower die member 9, as shown in FIG. 7, to enclose the filter element 2 therein, so that the grooves 12 and 13 as well as the space 14c are closed. As seen from FIG. 7, a circumferential portion of the outermost peripheral end 2b, except at those discontinuous portions 10d to 10f of the outer annular projection 10, is pressed and firmly held between the outer wall of the outer annular projection 10 and an outer wall 8a of the upper die member 8. A circumferential portion of the innermost peripheral end 2a, except at those discontinuous portions 11d to 11f of the inner annular projection 11, is likewise pressed and firmly held between the inner annular projection 11 and an inner wall 8b of the upper die member 8.

Both of the abutting sides 2e and 2f are interposed between and pressed by the comb-like projections of the upper and lower die members 8 and 9, so that the abutting sides 2e and 2f are firmly held in position in which the abutting sides project into the space 14c. Since these portions are pressed, the thickness of the filter material at these portions are made smaller than that of the other wave portions.

Figure 8:
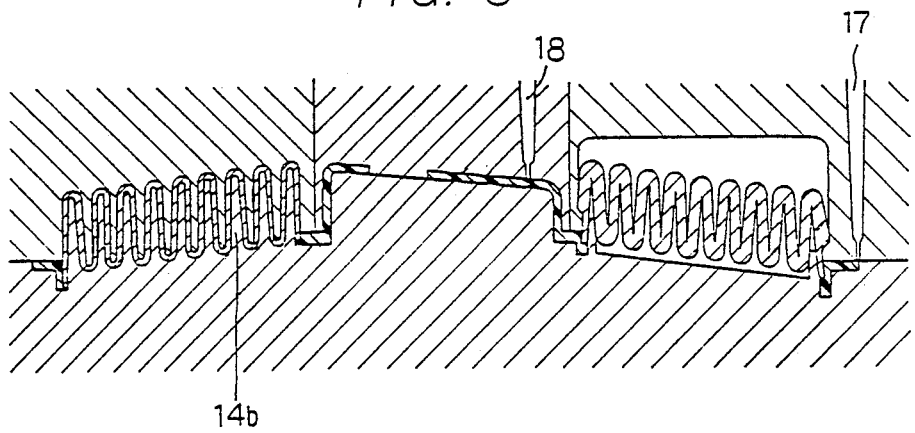
FIG. 8 is a cross-sectional view taken along a line VIII—VIII in FIG. 9, showing the filter element set in the molding die apparatus after the synthetic resin is filled.
Figure 9:
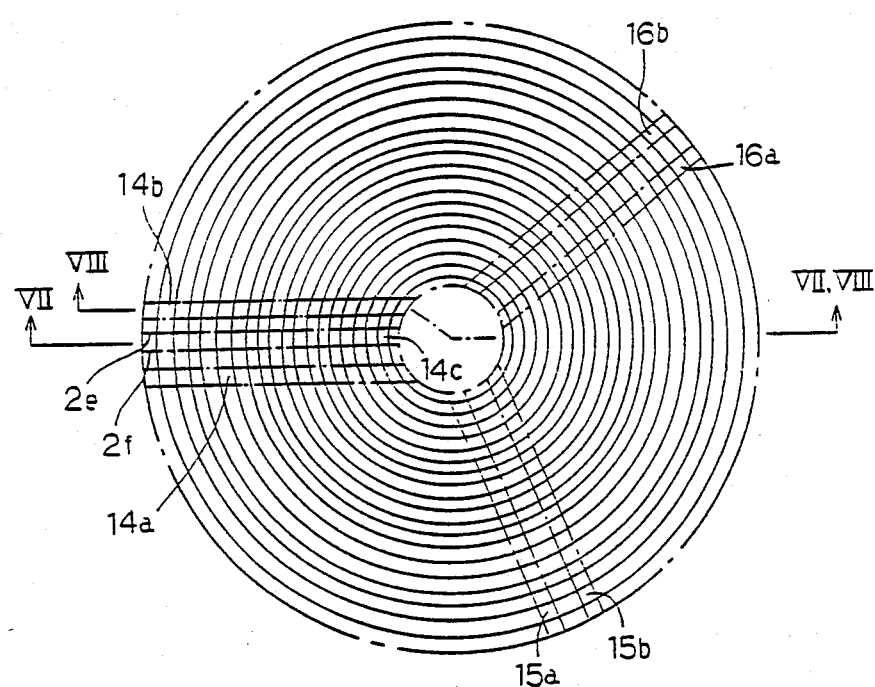
FIG. 9 is a schematic view of the filter element set in the molding die apparatus.

Molten synthetic resin is then injected into the die apparatus through ports 17 and 18 as shown in FIG. 8, so that the grooves 12 and 13 as well as the spaces 14c, 15c, and 16c are filled with the synthetic resin. When the resin is cooled down, the filter element 2 integrally molded with resin at its inner and outer peripheries and its connecting portion is removed from the die apparatus to obtain the filter device shown in FIG. 3.

Figure 10:
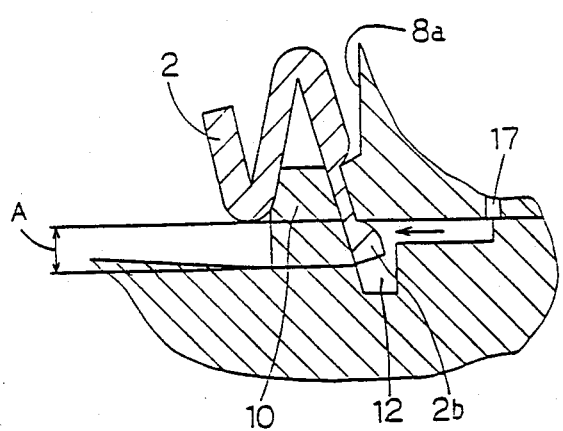
FIG. 10 is an enlarged view of an encircled portion A in FIG. 7.

When a length of the outermost peripheral end 2b projecting into the groove 12 is not sufficient, the end 2b may be turned up during the molding step and may be exposed to the outside of the support frame 7 after it is molded. However, contrary to that, since the width of the arcuate band between the folding line R—R' and end line S—S' is made larger than that of the other arcuate bands in the present invention, as already described above with reference to FIG. 1, more in detail by a width A as shown in FIG. 10, the outermost peripheral end 2b is sufficiently embedded in the resin filled in the groove 12. Furthermore, since the resin pouring port 17 is so positioned that the molten resin flows in a direction indicated by an arrow in FIG. 10, the end 2b of the filter element is pressed to the outer surface of the annular groove 10. As a result, it is prevented that the end of the filter element is turned up during the molding step.

A construction of an air cleaner device for an automotive internal combustion engine, in which the above-described filter device is installed, will be explained.

Figure 11:
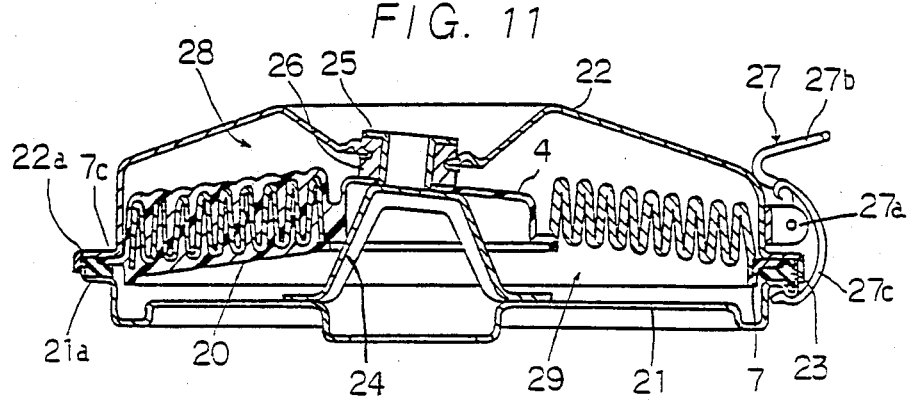
FIG. 11 is a cross-sectional view taken along a line XI—XI in FIG. 12, showing an air cleaner equipped with the filter device according to the present invention for an automotive internal combustion engine.
Figure 12:
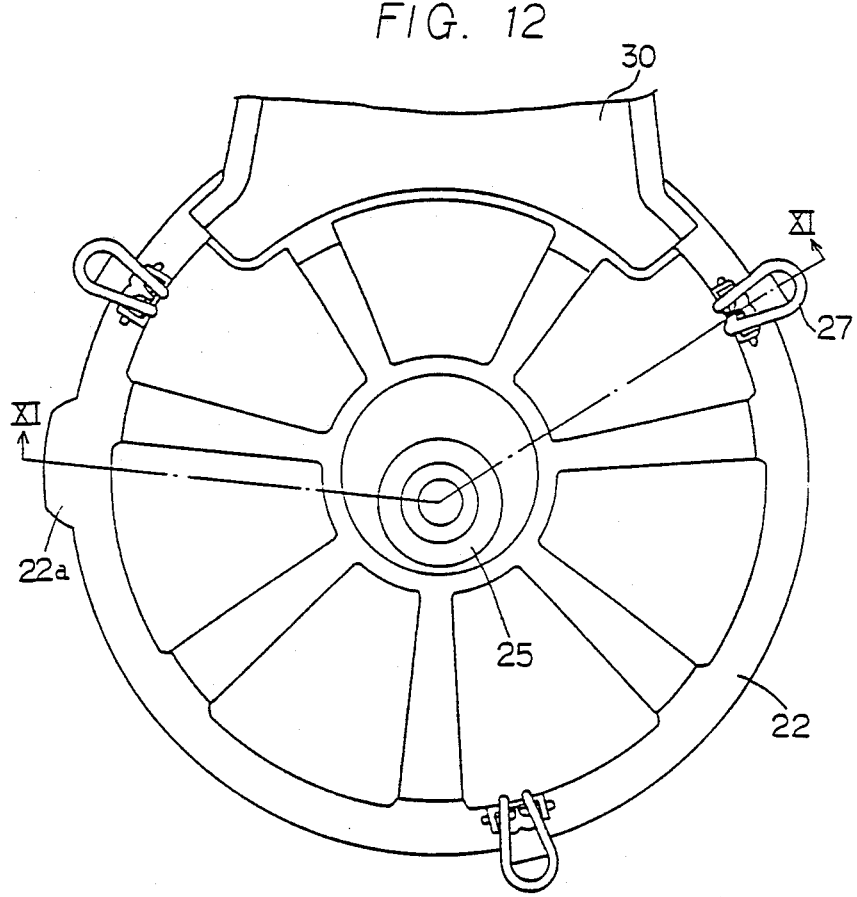
FIG. 12 is a plane view of the air cleaner shown in FIG. 11.

In FIGS. 11 and 12, a filter device 20 is disposed in a space defined by a casing 21 and a cap 22, and the ring-shaped support frame 7 of the filter device 20 is interposed and held between the casing 20 and the cap 21 by means of a sealing gasket 23.

The central portion 4 of the filter device 20 is supported on a supporting stay 24 arranged in the casing 21.

The filter device 20 is integrally formed with a projecting portion 7c at an outer peripheral portion of the support frame 7 (shown in FIGS. 3 and 4) for circumferentially positioning the filter device 20 in the casing 21. In accordance with this positioning portion 7c, the casing 21 is integrally formed with a step portion 21a while the cap 18 is integrally formed with a projection 22a. In the drawings, numeral 25 designates a metal collar, numeral 26 a rubber ring, and numeral 27 a cramp for fixing the cap 22 to the casing 21, wherein the cramp 27 comprises a pivot portion 27a attached to the cap 22, a lever portion 27b and an arm portion 27c.

Numeral 28 designates an uncleaned side, numeral 29 a cleaned side, and numeral 30 an intake pipe.

The present invention should not be limited to the above-described embodiment and the following various modifications can be possible.

(1) Although the wave portions of the filter element are slightly inclined between the innermost and outermost peripheral portions as seen from FIG. 4, it is possible to keep the height of each crest at the same level by making all of the widths between the folding lines on the filter sheet 1 in FIG. 1 equal to one another.

Figure 13:
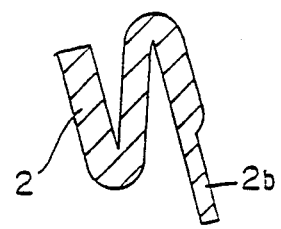
FIGS. 13 and 14 are views showing essential portions of other embodiments according to the present invention.

(2) Although the outermost peripheral end 2b of the filter element is pressed when the filter element is set in the molding die apparatus, as explained above with reference to FIG. 10, the peripheral end 2b may be pressed, as shown in FIG. 13, before the filter element is set in the die apparatus so that the peripheral end 2b can be hardened to facilitate the following manufacturing steps. The innermost peripheral end can be also previously pressed.

Figure 14:
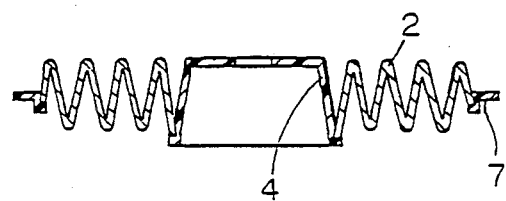

(3) Although the width of the outermost arcuate band is made larger than that of the other arcuate bands, the width of innermost arcuate band may be also made larger than that of the other bands as shown in FIG. 14 or both of the inner-and outermost arcuate bands may be made larger.

(4) The present filter device can be used in various apparatuses in addition to the liquid and/or air cleaner for an automotive vehicle.

As described above in detail, according to the present invention, the filter device can be installed in the casing by the support frame formed at the outer periphery of the filter element and the central portion formed at the inner periphery thereof.

According to the present invention, a molding step for forming the connecting portion between the both abutting sides of the filter element as well as molding step for forming the central portion and the support frame can be done simultaneously, whereby the manufacturing steps can be simplified and the filter device low in cost can be obtained. Furthermore, the connecting strength between the filter element and the support frame and/or the central portion can be enhanced.

What is claimed is:

1. A filter device comprising:
an annular filter element made of filter sheet material and having a plurality of annular wave portions extending outwardly;
a central portion made of synthetic resin and arranged at an inner periphery of said filter element, an innermost peripheral end of said filter element being held by said central portion;
a support frame made of synthetic resin and arranged at an outer periphery of said filter element, an outermost peripheral end of said filter element being held by said support frame; and
a connecting portion made of synthetic resin and positioned where both sides of said filter element are abutting on opposite sides of said connecting portion, said connecting portion being provided along a whole length from a bottom end of said annular wave portions to a top end thereof, said connecting portion being inserted between adjacent side surfaces of said annular wave portions for rigidly fixing said adjacent side surfaces of said annular wave portions, both of said sides of said filter sheet material being held by said connecting portion, wherein said central portion, said support frame and said connecting portion are made as an integral structure.

2. A filter device as set forth in claim 1 further comprising:
a plurality of reinforcing portions made of synthetic resin and arranged between said central portion and said support frame to extend with a radial direction of said annular wave portions, said reinforcing portions being so located and provided along with a whole length from a bottom end of said annular wave portions to a top end thereof that said reinforcing portions are inserted between adjacent side surfaces of said annular wave portions for rigidly fixing said adjacent side surfaces of said annular wave portions.

3. A filter device as set forth in claim 2 wherein said reinforcing portions are integrated with said central portion, said support frame and said connecting portion.

4. A filter device comprising:
an annular filter element made of a filter sheet and having a plurality of annular wave portions extending outwardly;
a support frame made of synthetic resin and arranged at an outer periphery of said filter element, an outermost peripheral end of said filter element being held by said support frame; and
a connecting portion made of synthetic resin and arranged at a portion where both sides of said filter element are abutting on each other, said connecting portion being so located and provided along with a whole length from a bottom end of said annular wave portions to a top end thereof that said connecting portion is inserted between adjacent side surfaces of said annular wave portions for rigidly fixing said adjacent side surfaces of said annular wave portions, both of said sides of said filter sheet being embedded in and held by said connecting portion, wherein said support frame and said connecting portion are made as a unitary structure.

5. A filter device as set forth in claim 4 further comprising;
a plurality of reinforcing portions made of synthetic resin and arranged between said central portion and said support frame to extend with a radial direction of said annular wave portions, said reinforcing portions being so located and provided along with a whole length from a bottom end of said annular wave portions to a top end thereof that said reinforcing portions are inserted between adjacent said surfaces of said annular wave portions for rigidly fixing said adjacent side surfaces of said annular wave portions.

6. A filter device as set forth in claim 5 wherein said reinforcing portions are integrated with said support frame and said connecting portion.

7. A filter device comprising:
an annular filter element made of filter sheet material and having a plurality of annular wave portions extending outwardly;
a central portion made of synthetic resin and arranged at an inner periphery of said filter element, an innermost peripheral end of said filter element being held by said central portion;
a support frame made of synthetic resin and arranged at an outer periphery of said filter element, an outermost peripheral end of said filter element being held by said support frame; and
a connecting portion made of synthetic resin and positioned where both sides of said filter element are abutting on opposite sides of said connecting portion, said connecting portion being provided along a whole length from a bottom end of said annular wave portions to a top end thereof, said connecting portion being inserted between adjacent side surfaces of said annular wave portions for rigidly fixing said adjacent side surfaces of said annular wave portions, both of said sides of said filter sheet being held by said connecting portion.

8. A filter device as set forth in claim 7 further comprising:
a plurality of reinforcing portions made of synthetic resin and arranged between said central portion and said support frame to extend with a radial direction of said annular wave portions, said reinforcing portions being so located and provided along with a whole length from a bottom end of said annular wave portions to a top end thereof that said reinforcing portions are inserted between adjacent side surfaces of said annular wave portions for rigidly fixing said adjacent side surfaces of said annular wave portions.

9. A filter device comprising:
an annular filter element made of filter sheet material and having a plurality of annular wave portions extending outwardly;
a support frame made of synthetic resin and arranged at an outer periphery of said filter element, an outermost peripheral end of said filter element being held by said support frame; and
a connecting portion made of synthetic resin and positioned where both sides of said filter element are abutting on opposite sides of said connecting portion, said connecting portion being provided along a whole length from a bottom end of said annular wave portions to a top end thereof, said connecting portion being inserted between adjacent side surfaces of said annular wave portions for rigidly fixing said adjacent side surfaces of said annular wave portions, both of said sides of said filter sheet being held by said connecting portion.

10. A filter device as set forth in claim 9 further comprising:
a plurality of reinforcing portions made of synthetic resin and arranged between said central portion and said support frame to extend with a radial direction of said annular wave portions, said reinforcing portions being so located and provided along with a whole length from a bottom end of said annular wave portions to a top end thereof that said reinforcing portions are inserted between adjacent side surfaces of said annular wave portions for rigidly fixing said adjacent side surfaces of said annular wave portions.

11. A filter device comprising:
an annular filter element having filter sheet material and being formed so as to have a plurality of annular wave portions extending outwardly;
a central portion made of synthetic resin and arranged at an inner periphery of said filter element, an innermost peripheral end of said filter element being held by said central portion;
a support frame made of synthetic resin and arranged at an outer periphery of said filter element, an outermost peripheral end of said filter element being held by said support frame; and
fixing portions made of synthetic resin and positioned so that ends of adjacent filter elements abut opposite sides of a fixing portion, said fixing portions being provided along a whole length from a bottom end of said annular wave portions to a top end thereof, said fixing portions being inserted between adjacent side surfaces of said annular wave portions for rigidly fixing said adjacent side surfaces of said annular wave portions, both of said sides of said filter sheet elements being held by said fixing portions, wherein said central portion, said support frame and said fixing portions are made as an integral structure.

12. A filter device comprising:
a synthetic resin support frame forming a substantially circular profile outer periphery of said filter device;
at least two synthetic resin fixing portions oriented along radial lines extending from a position central of said support frame to the periphery thereof;
a filter element section held between a surface of one of said fixing portions and a surface of another of said fixing portions, each filter element section including a plurality of wave portions forming from a top view of the filter device, a plurality of annular rings from said central position to said periphery, the fixing portions holding the filter element section rigid from an innermost end thereof to an outermost end thereof and from a top surface thereof to a bottom surface thereof.

13. A filter device according to claim 12 wherein said support frame includes a substantially cylindrical central portion, the fixing portions running from said central portion to said periphery.

14. A filter device according to claim 12 wherein said support frame and connecting portions are formed as an integral construction.

15. A filter device according to claim 12 wherein said filter element sections have edge portions embedded in the respective synthetic resin fitting portions.

16. A filter element according to claim 13 wherein an end of said filter element is embedded in said central portion.

* * * * *

UNITED STATES PATENT AND TRADEMARK OFFICE
CERTIFICATE OF CORRECTION

PATENT NO. : 4,744,902

DATED : May 17, 1988

INVENTOR(S) : Yoshihiro TAKI, Toshiaki FUKUTA, Hajime AKADO, Susumu MIYAKAWA

It is certified that error appears in the above-identified patent and that said Letters Patent is hereby corrected as shown below:

ON THE COVER PAGE:

The wrong four inventors are listed on the patent. The names are as follows: Yoshihiro Taki, Toshiaki Fukuta, Hajime Akado, Susumu Miyakawa, "Yoshitaka Nishio" , please change to:

--YOSHIHIRO TAKI, TOSHIAKI FUKUTA, HAJIME AKADO, SUSUMU MIYAKAWA--

Signed and Sealed this

Twenty-second Day of November, 1988

Attest:

DONALD J. QUIGG

Attesting Officer

Commissioner of Patents and Trademarks